United States Patent [19]
Allen

[11] Patent Number: 4,557,320
[45] Date of Patent: Dec. 10, 1985

[54] CENTRALIZED AIRLOCK COMPARTMENT UNIT

[76] Inventor: Norris K. Allen, 215 Hasty Rd., NE., Rome, Ga. 30161

[21] Appl. No.: 433,693

[22] Filed: Dec. 30, 1982

[51] Int. Cl.⁴ .............................................. B60H 1/00
[52] U.S. Cl. ..................................... 165/46; 126/204; 165/48.1
[58] Field of Search ............... 165/46, 48 R; 126/204, 126/208, 210

[56] References Cited

U.S. PATENT DOCUMENTS

| | | | |
|---|---|---|---|
| 3,110,301 | 11/1963 | Bricker | 126/208 |
| 3,406,678 | 10/1968 | Hanks | 165/46 X |
| 3,452,812 | 7/1969 | Betts | 165/46 |
| 3,497,672 | 2/1970 | Harter et al. | 165/46 X |
| 3,572,314 | 3/1971 | Teague, Jr. | 126/210 |
| 3,738,367 | 6/1973 | Hardy | 165/46 X |
| 3,743,012 | 7/1973 | Laxo | 165/46 X |
| 3,744,053 | 7/1973 | Parker et al. | 165/46 X |
| 3,995,627 | 12/1976 | O'Neill | 2/2.1 R |
| 4,194,247 | 3/1980 | Melander | 2/2 |
| 4,418,745 | 12/1983 | Roehr | 165/46 |

Primary Examiner—Sheldon J. Richter

[57] ABSTRACT

This device attaches to a suit, and serves to keep a driver or other wearer cool, or warm, when desired. Primarily, it consists of a main unit with a blower, and the main unit may be coupled to a second unit that can be worn by another person, who may be a passenger in an open top vehicle. It further includes an attachable air cooler, and an attachable propane gas heater.

2 Claims, 8 Drawing Figures

U.S. Patent  Dec. 10, 1985  4,557,320
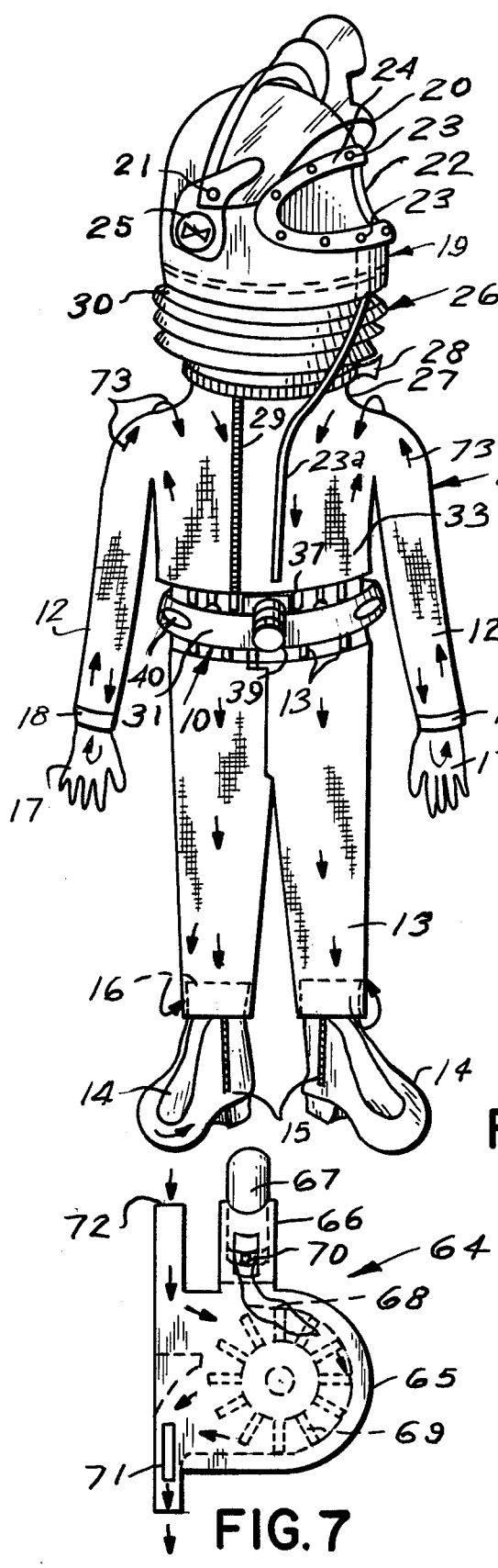
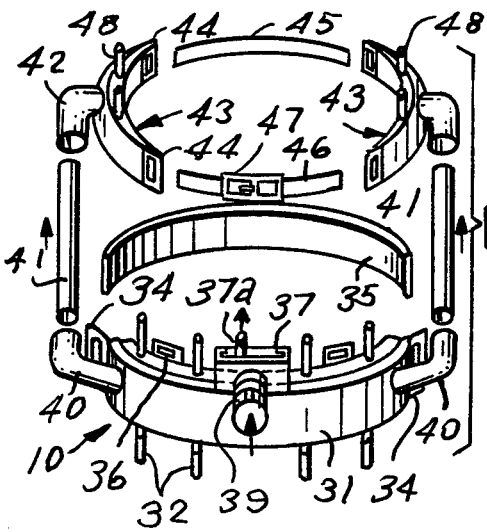
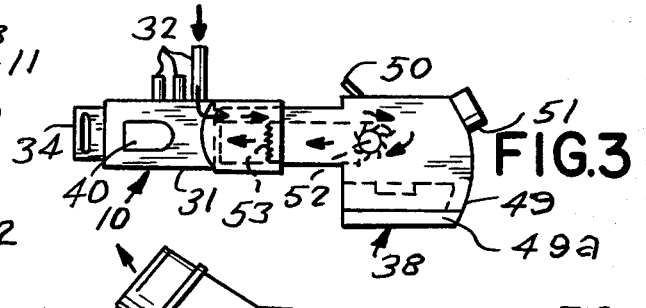
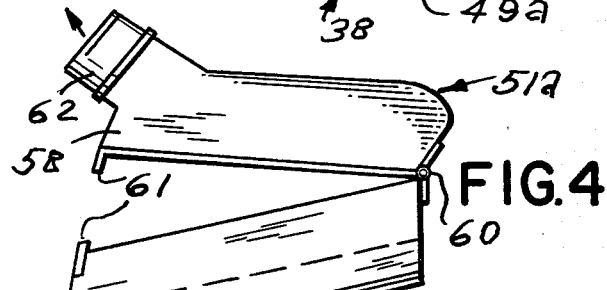
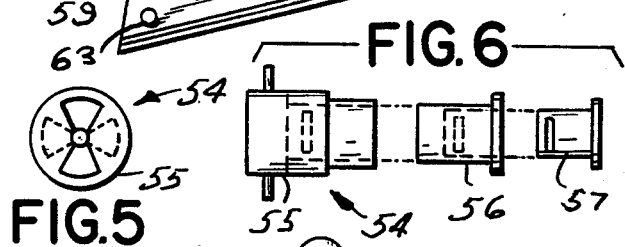
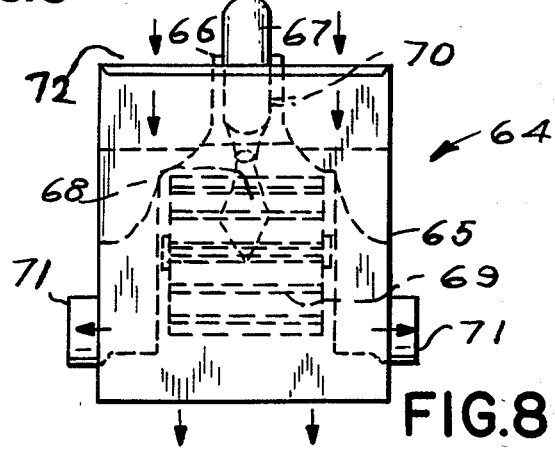
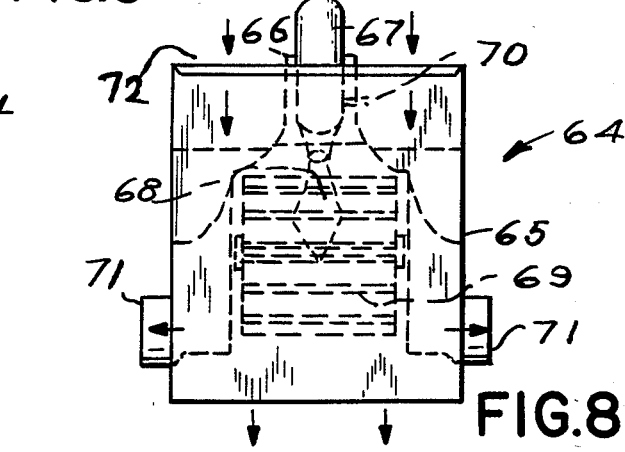

CENTRALIZED AIRLOCK COMPARTMENT UNIT

This invention relates to protective garments, and more particularly, to a centralized airlock compartment unit.

The principal object of this invention is to provide a centralized airlock compartment unit, which will be used by the operators of open top vehicles, such a motorcycles, tractors, etc.

Another object of this invention is to provide a centralized airlock compartment unit, which will enable the operators of open top vehicles to be more comfortable, in both winter and summer, as it is well known that specific ways and clothing are required for a person who is operating an open vehicle in cold or hot weather.

Another object of this invention is to provide a centralized airlock compartment unit, which will be in cooperation with a garment or suit. The Master Centralized Airlock Unit, the air circulated down and up in front of suit 11, circulated through boots and gloves and return on back of suit 11, and over shoulder to the center front 37 into the return vent, as illustrated by the arrow 73.

A further object of this invention is to provide a centralized airlock compartment unit, which will be adaptable for use by construction workers and will be safe in use.

Other objects are to provide a centralized airlock compartment unit, which is simple in design, inexpensive to manufacture, rugged in construction, easy to use, and efficient in operation.

These, and other objects, will be readily evident, upon a study of the following specification, and the accompanying drawing, wherein:

FIG. 1 is a front elevational view of the present invention;

FIG. 2 is a partially exploded view of the centralized airlock compartment for the driver and passenger;

FIG. 3 is a side elevational view of the warm or cold air blower;

FIG. 4 is a side elevational view of the ice cooler of the invention;

FIG. 5 is a front elevational view of the air damper control device of the invention;

FIG. 6 is an exploded side view of FIG. 5;

FIG. 7 is a side elevational view of the propane gas heater of the invention; and FIG. 8 is a front view of FIG. 7.

According to this invention, a centralized airlock compartment unit 10, for a vehicle operator, is shown secured to the waist area of a suit II, which is made of a suitable waterproof material, such as poplin. Suit 11 is constructed so as to enable air to circulate through its lining freely, and it includes arm portions 12, glove portion 17, leg portion 13 and boot portion 14. A pair of boots 14, having a zipper 15, are provided for use with suit 11, and includes a cuff 16 that is received in the lower ends of leg portions 13. A pair of gloves 17 also have an upper cuff 18, which is received in the lower ends of arm portions 12. A helmet 19 includes a hood type shield 20 of clear plastic material, which is pivotally secured thereto by pivotal mounts 21, in a manner known in the art. Shield 20 provides for covering the face opening 22 in helmet 19 when the vehicle is traveling at high speed, and also serves to prevent rain from coming in on the operator's face. A plurality of spaced openings 23, in face plate 24, serve as outlet means, for defrosting of shield 20, through hose 23a connected to suit 11, and an adjustable vent 25 is suitably mounted on each side of helmet 19. A helmet and suit connector 26, of annular configuration, is received in the bottom opening of helmet 19, and is zippered to the neck portion 27 of suit 11 by a zipper 28. Suit 11 is also provided with a front zipper 29, and it is to be noted, that connector 26 includes an upper roller band 30, which is the portion received inside of helmet 19. The band 30 is adjustable outward and locks inside of helmet 19, and the rollers, not shown, move with the movement of the user's neck.

Unit 10, which is a master unit, includes a hollow housing 31, having a plurality of spaced-apart upper and lower tubes 32, which are fixedly secured thereto. The upper tubes 32 plug into the inside of the upper body portion 33 of suit 11, and lower tubes 32 plug into the inside of the leg portions 13 of suit 11, for air flow. Tubes 32 are also retractable, in a manner not shown, when not in use, and a pair of loops 34 are fixedly secured, one to each end of housing 10, in a suitable manner, for receiving a belt 35, which will fasten housing 31 to the user's waist. A pair of spaced-apart secondary loops 36 are also fixedly secured to the top portion of housing 31, so as to serve as auxiliary securement for housing 31, through the use of snap belts, not shown. A rectangular fitting 37 is fixedly secured and projecting from the top of the center portion of housing 31, and fits inside of the suit 11 lining, for air return back through blower 38, which hereinafter will be described. A nozzle 39 is fixedly secured to the front face of fitting 37 in a suitable manner, for air passage, and an elbow fitting 40 is fixedly secured to each side of the front of housing 31, and receives a flexible hose 41. The opposite ends of the pair of hoses 41 are received by similar fittings 42, which are fixedly secured to the sides of a pair of hollow ducts 43, which include fixed loops 44 at each end, for receiving belts 45 and 46, the belt 46 including a buckle 47, for fastening ducts 43 to the waist of a passenger in or on the open vehicle. Ducts 43 also include tubes 48, similar to tubes 32 of housing 31, which are plugged into the suit of the passenger, which is similar to suit II of the vehicle operator.

It shall also be noted, that tube 37a, with circulating air from housing 31, is plugged into the lower end of hose 23a on the interior of suit 11, for defrosting air to openings 23, and unit 10 must be on the operator's body, above the navel.

It shall be noted that the bottom portion 59, is designed with a magnetic bracket to suitably secure on motorcycle gas tank or any other metal surface.

Blower 38 consists of a housing 49, having a projecting catch 50, for snapping its forward end into nozzle 39, and neck 51 is closed when not receiving air, by connecting a flexible hose, not shown, to the air cooler 51a. A suitable mounted impeller 52 is secured in housing 49, and also a heating element 53 for heating the air, and the motor of the impeller, and the heating element, are wired to the cigarette lighter or vehicle battery in a suitable manner, now shown. A damper 54, which includes an outer sleeve 55, slidably receives a second sleeve 56, and a third sleeve 57 is slidably received in the second sleeve 56, the combination being mounted to nozzle 39, so as to open and close, to control the air flow from blower 38, in a manner known in the art, and blower 38 may be adapted to mount inside of housing 31 if desired with two departments, first for passenger, second for the operator. A magnetic bracket 49a is suitably secured to the bottom of housing 49, so as to hold blower 38 to the vehicle temporarily, when the operator is dismounted therefrom.

The air cooler 51a includes a top portion 58, which is hinged to a bottom portion 59, by a hinge 60, and 58 and 59 snap close by a pair of latches 61. A ball-type adapter 62 on 58 connects by a hose, not shown, to neck 51 of blower 38, so as to cause cool air to be pulled into blower 38 in hot weather. Air cooler 51a is filled with ice when used, and it also serves as container storage for beverages and drinking water. Cooler 51a further includes a petcock 63 for releasing liquids therefrom.

A heater 64 includes a housing 65, which includes a neck 66, for removably receiving a disposable propane gas tank 67, which, when the gas is lighted, will produce a flame 68, that will rotate a cylinder-type fan 69, mounted in housing 65. The flame 68, being in tangency with fan 69, causes the rotation, and a thermostat control 70 is included in neck 66. The opening 71 in housing 65 enables the warmed air to enter the suit II, and the opening 72 is the return vent, that brings the air back into housing 65.

In operation, the heater is placed in a pocket on the back of suit II, which is not shown, and the air is circulated in the suit 11 by traveling down the back of the suit 11, and returning up the front, then circulating through arm and gloves. Air travels upward the arm over the shoulder back to return 72. This unit primarily can be used for construction worker suits or any other open top vehicle.

The master centralized blower motor will be sealed off in one side of cover 38 for weather protection. The motor shaft will turn the cylinder fan.

It shall further be noted, that helmet 19 may be adapted to receive a microphone and head phones built in 25 or the like.

While various changes may be made in the detail construction, it is understood that such changes will be within the spirit and scope of the present invention, as is defined by the appended claims.

I claim:

1. A centralized airlock compartment, comprising:
   a suit comprising a leg portion and an upper body portion;
   means for circulating fluid through said leg portion and said upper body portion, said circulating means including a rigid, detachable manifold adapted to fit about the waist of a person wearing said suit so as to disperse fluid into and receive fluid from said suit, said manifold being provided within said suit so as to support said person wearing said suit and to assist said person in bearing the weight of said suit;
   a blower in communication with said manifold and operative for flowing fluid into said suit;
   a damper disposed between said blower and said manifold and operative for regulating the flow of fluid into said suit;
   an air cooler received on said suit, said air cooler being in communication with said blower and said manifold; and
   a heater received on said suit, said heater being in communication with said blower and said manifold,
   whereby air may be blown through said air cooler or said heater by said blower and into said manifold, and circulated through said suit so as to thermally insulate said person from a hostile temperature environment.

2. The centralized airlock compartment of claim 1 further comprising at least one boot and at least one glove, said boot and said glove being in communication with said circulating means so that air may be circulated therethrough.

* * * * *